US012640781B2

(12) United States Patent
Bailey et al.

(10) Patent No.: US 12,640,781 B2
(45) Date of Patent: May 26, 2026

(54) SYSTEM AND METHOD FOR EXPLICIT MU-MIMO INDICATOR

(71) Applicant: T-Mobile Innovations LLC, Overland Park, KS (US)

(72) Inventors: Christopher Thomas Bailey, Overland Park, KS (US); Ryan Patrick Dreiling, Shawnee, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 294 days.

(21) Appl. No.: 18/484,877

(22) Filed: Oct. 11, 2023

(65) Prior Publication Data

US 2025/0126621 A1 Apr. 17, 2025

(51) Int. Cl.
| | |
|---|---|
| *H04B 7/0452* | (2017.01) |
| *H04B 7/06* | (2006.01) |
| *H04W 72/232* | (2023.01) |
| *H04W 76/15* | (2018.01) |

(52) U.S. Cl.
CPC ......... *H04B 7/0452* (2013.01); *H04B 7/0617* (2013.01); *H04W 72/232* (2023.01); *H04W 76/15* (2018.02)

(58) Field of Classification Search
CPC . H04W 72/232; H04W 76/15; H04W 72/046; H04B 7/0452; H04B 7/0617
See application file for complete search history.

(56) References Cited

U.S. PATENT DOCUMENTS

| | | | |
|---|---|---|---|
| 11,411,632 B2 | 8/2022 | Long et al. | |
| 2015/0043525 A1* | 2/2015 | Jiang .................... | H04L 5/0005 |
| | | | 370/330 |
| 2015/0208433 A1* | 7/2015 | Fan ....................... | H04L 5/0023 |
| | | | 370/329 |
| 2016/0128025 A1 | 5/2016 | Zhang et al. | |
| 2018/0367270 A1* | 12/2018 | Raghavan ........... | H04W 72/046 |
| 2020/0343945 A1 | 10/2020 | Stephenne et al. | |
| 2022/0158703 A1* | 5/2022 | Jiang .................... | H04B 7/0634 |
| 2022/0414946 A1* | 12/2022 | Choi ........................ | H04L 9/50 |
| 2023/0137792 A1 | 5/2023 | Parihar et al. | |
| 2023/0208478 A1* | 6/2023 | Sung ................... | H04W 72/566 |
| | | | 375/262 |

(Continued)

FOREIGN PATENT DOCUMENTS

| | | | | |
|---|---|---|---|---|
| CN | 113271129 A | * | 8/2021 | ........... H04B 7/0639 |

OTHER PUBLICATIONS

Luo et al., "A multi-user pairing method and base station", Aug. 17, 2021, CN, citations are from English translation of CN-113271129-A) (Year: 2021).*

(Continued)

*Primary Examiner* — Michael K Phillips
(74) *Attorney, Agent, or Firm* — Jones Burke, PLLC

(57) ABSTRACT

Systems and methods are provided for providing explicit MU-MIMO pairing indicator. Methods include maintaining a profile of one or more wireless devices in a wireless network using MU-MIMO. Methods further include receiving an indicator from one or more access nodes identifying MU-MIMO pairing for one or more wireless devices. Methods further include adjusting one or more of beamforming, layer assignment or throughput of the wireless network.

19 Claims, 5 Drawing Sheets

(56)                   References Cited

U.S. PATENT DOCUMENTS

2023/0246723 A1* 8/2023 Tzeng ................... H04J 3/0697
                                                      370/503
2024/0243791 A1* 7/2024 Huang ................... H04B 7/063
2025/0097773 A1* 3/2025 Zhang .............. H04W 28/0958

OTHER PUBLICATIONS

Extended European Search Report, dated Mar. 10, 2025, in copending European Application No. 24206029.1.

* cited by examiner

400

MAINTAINING A PROFILE OF ONE OR MORE WIRELESS DEVICES IN A WIRELESS NETWORK USING MU-MIMO
410

RECEIVE INDICATOR FROM ONE OR MORE ACCESS NODES IDENTIFYING MU-MIMO PAIRING FOR ONE OR MORE WIRELESS DEVICES
420

ADJUSTING ONE OR MORE OF BEAMFORMING, LAYER ASSIGNMENT OR THROUGHPUT OF THE WIRELESS NETWORK
430

500

MAINTAINING A PROFILE OF ONE OR MORE WIRELESS DEVICES IN A WIRELESS NETWORK USING MU-MIMO
510

DETERMINING THAT THE ONE OR MORE WIRELESS DEVICES IS PAIRED FOR MU-MIMO BASED ON SATISFYING A THRESHOLD
520

STORING AN INDICATOR AT THE PROFILE THAT INDICATES THE THRESHOLD HAS BEEN SATISFIED
530

1

SYSTEM AND METHOD FOR EXPLICIT MU-MIMO INDICATOR

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Wireless networks may be configured to utilize a single-user multiple-in multiple-out (SU-MIMO) operating mode and/or a multi-user (MU-MIMO) mode. In the SU-MIMO operating mode, multiple data streams are directed towards individual wireless devices. In the MU-MIMO operating mode, the multiple data streams can be directed towards plural wireless devices that are selected to participate in the MU-MIMO operating mode based on the orthogonality of transmission, thereby maximizing resources. MIMO has been identified as one of the promising air interface technologies to address the capacity requirement demanded by 5G networks. A device participating in MU-MIMO will have different performance characteristics than one not participating in MU-MIMO. When monitoring network traffic, there is a need to know whether the device is participating in MU-MIMO, in part, to help determine if the performance of the device is within expected parameters.

OVERVIEW

Examples described herein include methods and systems for providing an explicit MU-MIMO indicator. An exemplary method includes maintaining a profile of one or more wireless devices in a wireless network using MU-MIMO. The method additionally includes receiving at the profile of the one or more wireless devices an indicator from one or more access nodes identifying MU-MIMO pairing for the wireless devices. The method additionally includes adjusting one or more of beamforming, layer assignment or throughput of the wireless network based on one or more of the wireless devices using MU-MIMO connections.

Another exemplary embodiment includes a system configured with an access node including at least one electronic processor configured to perform operations. The operations include maintaining a profile of one or more wireless devices in a wireless network using MU-MIMO. The operations further include receiving at the profile of the one or more wireless devices an indicator from one or more access nodes identifying MU-MIMO pairing for the wireless devices in the wireless network. The operations further include adjusting one or more of beamforming, layer assignment or throughput of the wireless network based on one or more of the wireless devices using MU-MIMO connections.

Another exemplary method includes maintaining a profile of one or more wireless devices in a wireless network using MU-MIMO. The method further includes determining the one or more wireless devices is paired for MU-MIMO. The method further includes determining a threshold has been satisfied. The method further includes in response to the threshold being satisfied, storing an indicator at the profile indicating MU-MIMO pairing.

BRIEF DESCRIPTION OF THE DRAWINGS

These and other more detailed and specific features of various embodiments are more fully disclosed in the following description, reference being had to the accompanying drawings, in which:

2

Figure 1:
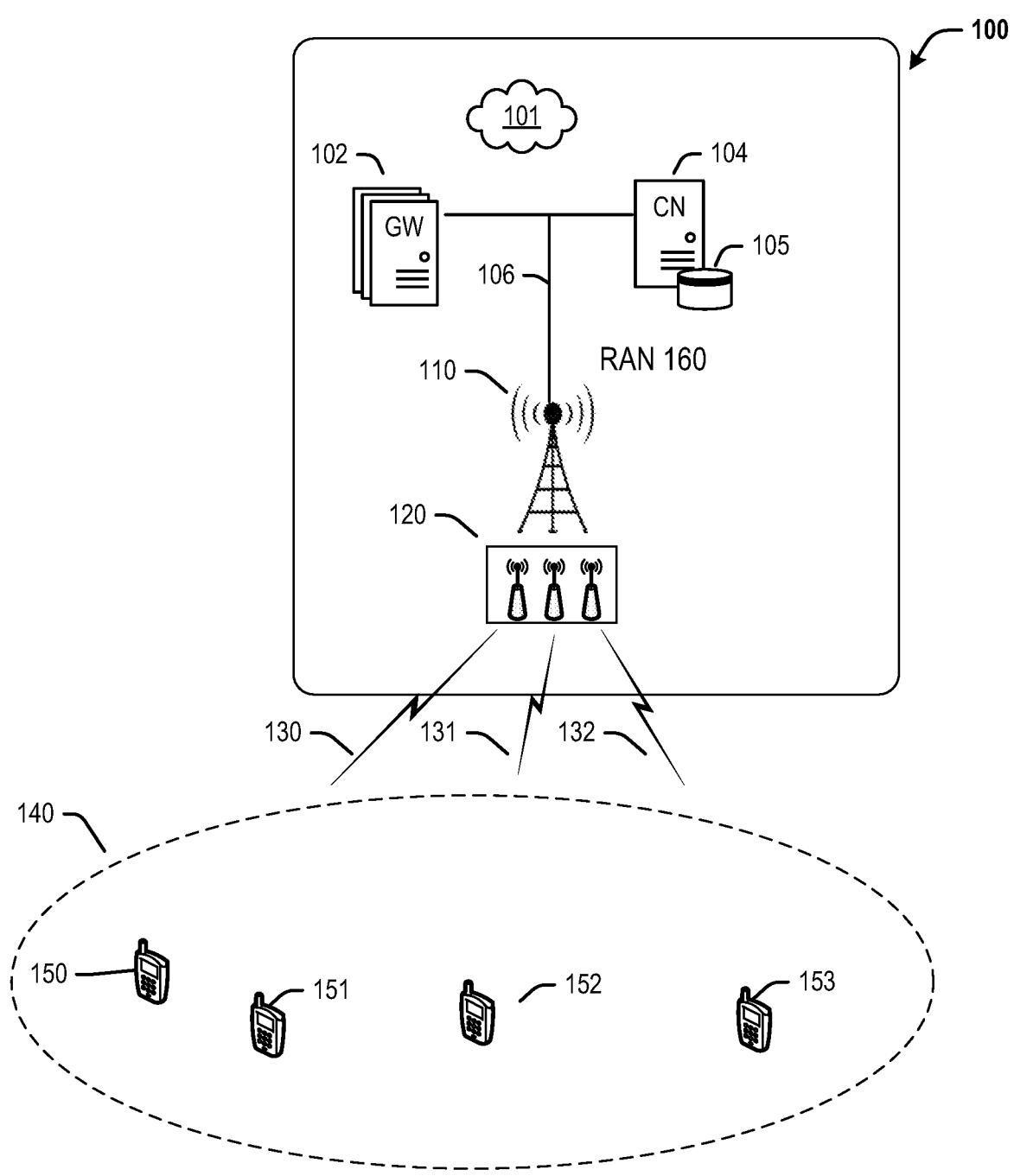
Figure 2:
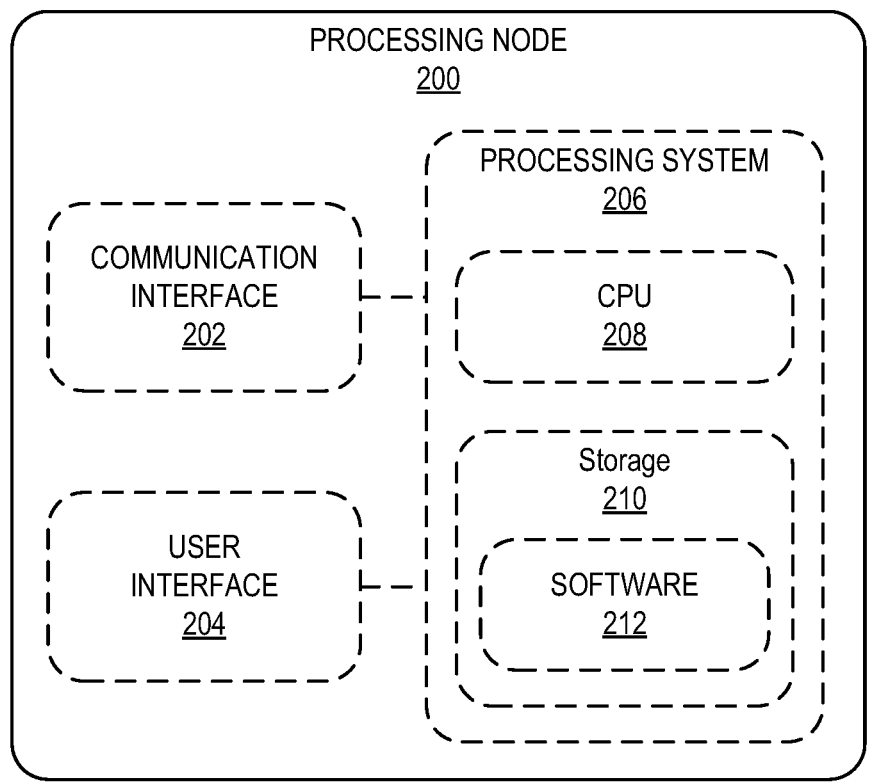
Figure 3:
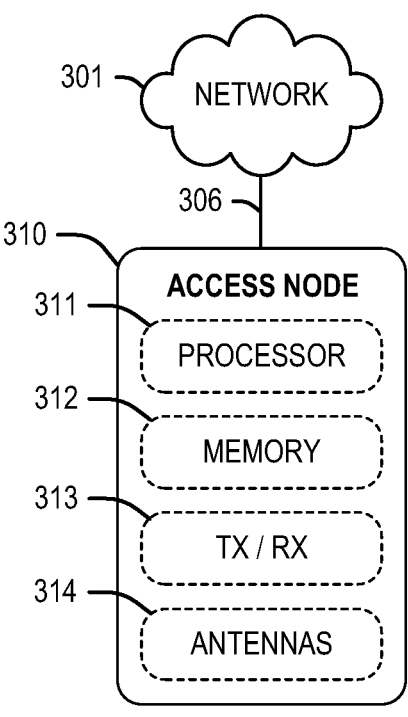
Figure 4:
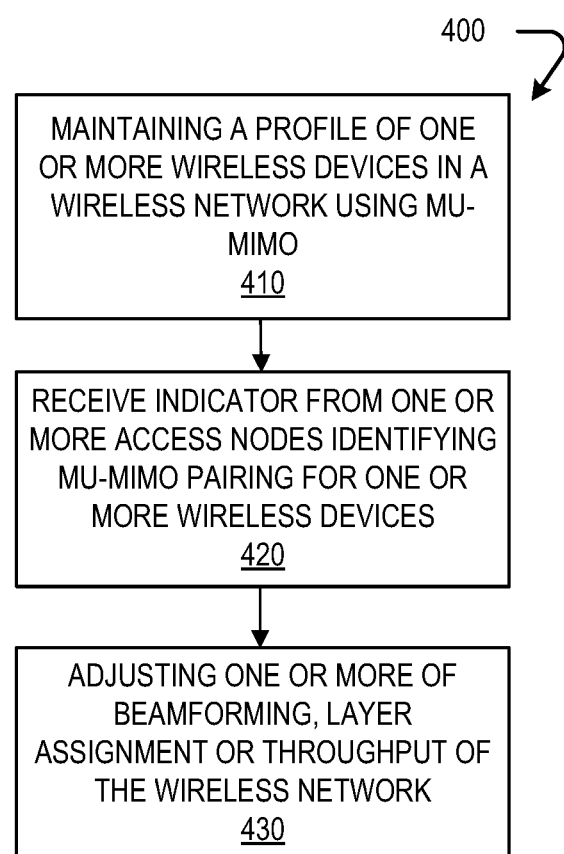
Figure 5:
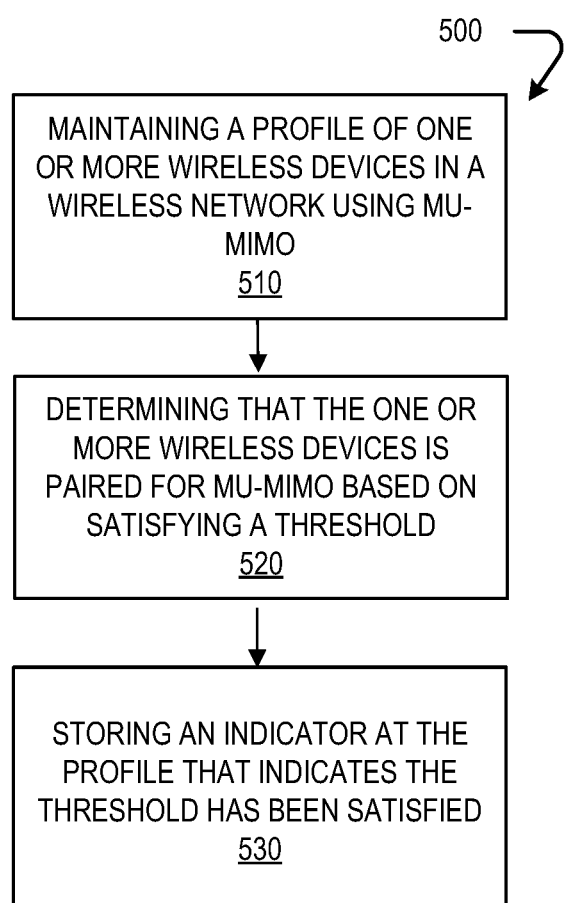

FIG. 1 illustrates an exemplary system for wireless communication in accordance with various aspects of the present disclosure;

FIG. 2 illustrates an exemplary processing node in accordance with various aspects of the present disclosure;

FIG. 3 illustrates an exemplary access node in accordance with various aspects of the present disclosure;

FIG. 4 illustrates an exemplary process flow for providing an explicit MU-MIMO indicator in a wireless network capable of MU-MIMO in accordance with various aspects of the present disclosure;

FIG. 5 illustrates an exemplary process flow for providing an explicit MU-MIMO indicator in a wireless network capable of MU-MIMO in accordance with various aspects of the present disclosure.

DETAILED DESCRIPTION

In the following description, numerous details are set forth, such as flowcharts, schematics, and system configurations. It will be readily apparent to one skilled in the art that these specific details are merely exemplary and not intended to limit the scope of this application.

In accordance with various aspects of the present disclosure, a cellular or wireless network may be provided by an access node. The access node may utilize one or more antennas to communicate with wireless devices. As the number of simultaneous wireless devices with which an access node communicates increases, the bandwidth available to each wireless device tends to decrease. One method of improving bandwidth is to increase the number of antennas and implement multiple input multiple output (MIMO) transmission. 5G wireless networks have implemented both single user MIMO (SU-MIMO) and multiuser MIMO (MU-MIMO). Often the bandwidth available and communication performance of an individual device will be different while the device is paired for SU-MIMO versus MU-MIMO. While monitoring the performance of the wireless network, it is important to know whether a wireless device is using MU-MIMO in order to understand the performance of the wireless device and wireless network.

Multi-user, multiple-input, multiple-output technology—better known as MU-MIMO (a.k.a. Next-Gen AC or AC Wave 2)—allows an access node to communicate with multiple devices simultaneously. This decreases the time each wireless device has to wait for a signal. An access node uses separate spatial streams to talk to multiple wireless devices concurrently.

When an access node is configured for MU-MIMO, the access node (such as a gNB) explicitly knows when a wireless device is paired to the router using MU-MIMO. Currently, the pairing data is only available to the gNB and not available in real-time. In order to determine if a MU-MIMO pairing of one or more wireless devices has occurred, KPIs are reviewed to estimate whether a wireless device is paired for MU-MIMO.

Wireless device MU-MIMO pairing is at the Radio Network Temporary Identifier (RNTI) level, so the pairing information is anonymous. In order to estimate a MU-MIMO pairing, wireless device logs are compared to defined C-RNTI. A rank indicator can be compared to the number of layers assigned in downlink control information (DCI), number of resource blocks allocated, and slot utilization. However, these are estimations after the fact and do not explicitly indicate a real-time MU-MIMO pairing of a wireless device.

This makes it difficult for operation engineers because they may not be informed of the intricacies of KPIs and statistics to estimate MU pairing. Also, without explicit indications for MU pairing, the investigating engineers may trouble shoot incorrect issues involved with beamforming, layer assignment, and throughput.

An access node transmits an indication via an explicit indicator in DCI messaging to confirm MU-MIMO wireless device pairing. Based on the confirmation, MU-MIMO wireless device pairing in the network can be determined, collected, and mapped for trouble shooting the network.

A profile of one or more wireless devices in a wireless network using multiuser multiple input multiple output (MU-MIMO) connection is maintained. An indication is received from one or more access nodes (gNB) identifying MU-MIMO pairing for the one or more wireless devices in the wireless network. Beamforming, layer assignment or throughput of the wireless network is adjusted based on the indication that one or more wireless devices are using MU-MIMO connections.

MU-MIMO wireless device usage is transmitted and maintained in a profile and can be utilized to gauge wireless device performance. MU-MIMO profile data may also be utilized to map MU-MIMO usage in the wireless network. The MU-MIMO profile data may be shared with those troubleshooting issues with the wireless device and/or the wireless network.

Therefore, a method described herein includes maintaining a profile of one or more wireless devices in a wireless network, identifying MU-MIMO paired wireless devices, and responsive to identifying MU-MIMO paired wireless devices transmitting an indicator, and adjusting beamforming, layer assignment or throughput of the wireless network or any combination of those, based on whether the wireless devices are using MU-MIMO. In order to identify MU-MIMO paired devices, the method may determine a threshold has been satisfied and store an indicator of an MU-MIMO pairing in a profile for the wireless device. The threshold could be optionally set at any appropriate level and could vary by access node or wireless device or any other appropriate criteria.

The access node may be a gNB device as part of a 5G wireless network or any other wireless network that supports MU-MIMO. The indicator that indicates a wireless device is using MU-MIMO may be transmitted by way of downlink control information (DCI) messaging.

In addition to the indicator of MU-MIMO pairing, the method may use other information available from DCI including the location and location history of the wireless devices and the usage information of the wireless devices. The method may also be able to determine which wireless devices are experiencing MU-MIMO most often or least often. This gathered information may be utilized for troubleshooting any potential issues with the wireless network or wireless devices. Additionally, the indicator may be made available to a user of the wireless device which could further help with troubleshooting.

FIG. 1 depicts an exemplary system 100 for monitoring MU-MIMO paired wireless devices. System 100 includes a communication network 101, gateway node(s) 102, controller node 104, access node 110, and wireless devices 150-153. Access node 110 can be any network node configured to provide communication between wireless devices 150-153 and communication network 101, including standard access nodes and/or short range, low power, small access nodes.

For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB, home eNodeB or home gNodeB device. By virtue of comprising a plurality of antennae 120 as further described herein, access node 110 can deploy or implement different radio access technologies (RATs) such as 3G, 4G, 5G, sub-6G, mm-wave, as well as transmission modes including multiple-input-multiple-output (MIMO), single user MIMO (SU-MIMO), multi-user MIMO (MU-MIMO), etc. Moreover, each of wireless devices 150-153 can also be equipped with a plurality of antennae enabling these different types of transmissions.

For example, each of wireless devices 150-153 may be capable of simultaneously communicating with access node 110 using combinations of antennae via 4G and 5G or any other RAT or transmission mode. For instance, MU-MIMO pairings can be made by wireless devices 150-153. It is noted that any number of access nodes, MU-MIMO groups, and wireless devices can be implemented.

In operation, access node 110 (or any other entity within system 100) may be configured to execute a method including maintaining a profile of one or more wireless devices in a wireless network, identifying MU-MIMO paired wireless devices, and responsive to identifying MU-MIMO paired wireless devices transmitting an indicator, and adjusting beamforming, layer assignment or throughput of the wireless network or any combination of those, based on whether the wireless devices are using MU-MIMO. In order to identify MU-MIMO paired devices, the method may determine a threshold has been satisfied and store an indicator of an MU-MIMO pairing in a profile for the wireless device. The threshold could be set at any appropriate level and could vary by access node or wireless device or any other appropriate criteria.

The access node may be a gNB device as part of a 5G wireless network or any other wireless network that supports MU-MIMO. The indicator that indicates a wireless device is using MU-MIMO may be transmitted by way of downlink control information (DCI) messaging.

In addition to the indicator of MU-MIMO pairing, the method may use other information available from DCI including the location and location history of the wireless devices and the usage information of the wireless devices. The method may also be able to determine which wireless devices are experiencing MU-MIMO most often or least often. This gathered information may be utilized for troubleshooting any potential issues with the wireless network or wireless devices. Additionally, the indicator may be made available to a user of the wireless device which could further help with troubleshooting.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with other access nodes (not shown) using a direct link such as an X2 link or similar.

Wireless devices 150-153 may be any device, system, combination of devices, or other such communication platform capable of communicating wirelessly with access node 110 using one or more frequency bands deployed therefrom. Each of wireless devices 150-153 may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 150-153, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path-including combinations thereof. Communication link 106 can be wired or wireless and use various communication protocols such as Internet, Internet protocol (IP), local-area network (LAN), optical networking, hybrid fiber coax (HFC), telephony, T1, or some other communication format-including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications link 106 may include S1 communications links. Other wireless protocols can also be used. Communication link 106 can be a direct link or might include various equipment, intermediate components, systems, and networks. Communication link 106 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), a user plane function (UPF), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a session management function (SMF), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing correlations of transmission types with antenna configurations, and so on. This information may be requested by or shared with access node 110 via communication link 106, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes but is not limited to access node 110, controller node 104, and/or network 101.

FIG. 2 depicts an exemplary processing node 200 for monitoring MU-MIMO wireless device pairing. The processing node 200 includes a communication interface 202, user interface 204, and processing system 206 in communication with communication interface 202 and user interface 204. Processing system 206 includes a processor 208, storage 210, which can comprise a disk drive, flash drive, memory circuitry, or other memory device including, for example, a buffer. Storage 210 can store software 212 which is used in the operation of the processing node 200. Software 212 may include computer programs, firmware, or some other form of machine-readable instructions, including an operating system, utilities, drivers, network interfaces, applications, or some other type of software. Processing system 206 may include a microprocessor 208 and other circuitry to retrieve and execute software 212 from storage 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 can include instructions for maintaining a profile of one or more wireless devices in a wireless network, identifying MU-MIMO paired wireless devices, and responsive to identifying MU-MIMO paired wireless devices transmitting an indicator, and adjusting beamforming, layer assignment or throughput of the wireless network or any combination of those, based on whether the wireless devices are using MU-MIMO. In order to identify MU-MIMO paired devices, the software 212 may contain instructions to determine a threshold has been satisfied and storing an indicator of an MU-MIMO pairing in a profile for the wireless device. The threshold could be set at any appropriate level and could vary by access node or wireless device or any other appropriate criteria.

The processing node 200 may be part of an access node which may be a gNB device as part of a 5G wireless network or any other wireless network that supports MU-MIMO. The indicator that indicates a wireless device is using MU-MIMO may be transmitted by way of downlink control information (DCI) messaging.

In addition to the indicator of MU-MIMO pairing, the software 212 may use other information available from DCI including the location and location history of the wireless devices and the usage information of the wireless devices. The software 212 may also be able to determine which wireless devices are experiencing MU-MIMO most often or least often. This gathered information may be utilized for troubleshooting any potential issues with the wireless network or wireless devices. Additionally, the indicator may be made available to a user of the wireless device which could further help with troubleshooting.

FIG. 3 depicts an exemplary access node 310 for providing wireless service in wireless networks. Access node 310 is configured as an access point for providing network services from network 301 to end-user wireless devices such as wireless devices 150-153 in FIG. 1. Access node 310 is illustrated as comprising a processor 311, a memory 312 for storing logical modules that perform operations described herein, and one or more transceivers 313 for transmitting and receiving signals via antennae 314. Combination of antennae 314 and transceivers 313 are configured to deploy one or more radio air interfaces using different RATs, frequencies, and/or operating modes. Additional transceivers and antennae may be incorporated in order to deploy 4G, 5G, mm-wave, SU-MIMO, MU-MIMO, or massive MU-MIMO data streams to wireless devices attached to access node 310, as well as to facilitate communication with other network nodes on network 301. Further, access node 310 is communicatively coupled to network 301 via communication interface 306, which may be any wired or wireless link as described above. The one or more antennae 314 can include any combination of: antennae associated with different radio access technologies (RATs) (including 3G, 4G, 5G, 5G sub 6G, 5G millimeter wave), antennae associated with different arrays (including 2×2, 4×2, 4×4, 8×8, 16×16, 32×32, 64×64, 128×128, and so on), and beamforming antennae.

In an exemplary embodiment, memory 312 can include instructions for maintaining a profile of one or more wireless devices in a wireless network, identifying MU-MIMO paired wireless devices, and responsive to identifying MU-MIMO paired wireless devices transmitting an indicator, and adjusting beamforming, layer assignment or throughput of the wireless network or any combination of those, based on whether the wireless devices are using MU-MIMO. In order to identify MU-MIMO paired devices, the memory 312 may contain instructions for determining the wireless devices are paired for MU-MIMO and consider them paired if a threshold is satisfied. The threshold could be set at any appropriate level and could vary by access node or wireless device or any other appropriate criteria.

The access node 310 which may be a gNB device as part of a 5G wireless network or any other wireless network that supports MU-MIMO. The indicator that indicates a wireless device is using MU-MIMO may be transmitted by way of downlink control information (DCI) messaging.

In addition to the indicator of MU-MIMO pairing, the instructions may use other information available from DCI including the location and location history of the wireless devices and the usage information of the wireless devices. The instructions may also be able to determine which wireless devices are experiencing MU-MIMO most often or least often. This gathered information may be utilized for troubleshooting any potential issues with the wireless network or wireless devices. Additionally, the indicator may be made available to a user of the wireless device which could further help with troubleshooting.

FIG. 4 illustrates an exemplary method 400 for providing an explicit MU-MIMO indicator in accordance with embodiments discussed herein. Method 400 may be performed by any suitable combination of processors, for example a processor contained in an access node such as access node 110, 310. In other embodiments, the method can be implemented with any suitable network element, such as a processing node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 400 begins in step 410 when a profile of one or more wireless devices in a wireless network using MU-MIMO is maintained. In step 420, the profile receives an indicator from one or more access nodes identifying MU-MIMO pairing for one or more wireless devices. In an exemplary embodiment, the indicator may be received as a downlink control information (DCI) message. In step 430, one or more of beamforming, layer assignment or throughput of the wireless network is adjusted. The described adjusting may be performed to improve the quality of the wireless network. For example, these adjustments may improve the spectral efficiency of the one or more access nodes.

Method 400 may also include optional steps of accessing one or more locations of the one or more wireless devices using MU-MIMO; accessing usage information for the one or more wireless devices using MU-MIMO; or identifying from the one or more wireless devices using MU-MIMO, the wireless device experiencing the least or most MU-MIMO pairing.

FIG. 5 illustrates an exemplary method 500 for providing an explicit MU-MIMO indicator in accordance with embodiments discussed herein. Method 500 may be performed by any suitable combination of processors, for example a processor contained in an access node, including a gNB access node included as part of a 5G wireless network.

Method 500 begins in step 510 when a profile of one or more wireless devices in a wireless network using MU-MIMO is maintained. In step 520 it is determined whether a threshold has been satisfied indicating a MU-MIMO pairing. In step 530, an indicator is stored for one or more wireless devices satisfying the threshold in the profile for the one or more wireless devices.

Method 500 may also include optional steps of accessing one or more locations of the one or more wireless devices using MU-MIMO; accessing usage information for the one or more wireless devices using MU-MIMO; identifying from the one or more wireless devices using MU-MIMO, the wireless device experiencing the least or most MU-MIMO pairing; or adjusting one or more of beamforming, layer assignment or throughput of the wireless network based on the one or more wireless devices using MU-MIMO. The described adjusting may be performed to improve the quality of the wireless network. For example, these adjustments may improve the spectral efficiency of the one or more access nodes.

In some embodiments, methods 400 and 500 may include additional steps or operations. Furthermore, the methods may include steps shown in each of the other methods. As one of ordinary skill in the art would understand, the methods of 400 and 500 may be integrated in any useful manner and the steps may be performed in any useful sequence.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   maintaining a profile of one or more wireless devices in a wireless network using multiuser multiple input multiple output (MU-MIMO);
   receiving at the profile of the one or more wireless devices an indicator from one or more access nodes identifying MU-MIMO pairing for the one or more wireless devices in the wireless network, wherein the indicator is available to a user of the one or more wireless devices; and
   adjusting one or more of beamforming, layer assignment or throughput of the wireless network based on the one or more wireless devices using MU-MIMO connections.

2. The method of claim 1, wherein the wireless network is a 5G wireless network and the one or more access nodes are gNB devices.

3. The method of claim 1, wherein the indicator is a downlink control information (DCI) message which includes performing downlink and uplink scheduling.

4. The method of claim 1, further comprising:
   accessing one or more locations of the one or more wireless devices using MU-MIMO.

5. The method of claim 4, further comprising:
   accessing usage information for the one or more wireless devices using MU-MIMO.

6. The method of claim 5, further comprising:
   identifying from the one or more wireless devices using MU-MIMO, the wireless devices experiencing the most MU-MIMO pairing.

7. The method of claim 1, wherein adjusting one or more of beamforming, layer assignment or throughput of the wireless network based on the one or more wireless devices using MU-MIMO connections serves to improve the throughput and/or improve spectral efficiency of the one or more access nodes.

8. A system comprising:
an access node including at least one electronic processor configured to perform operations including:
maintaining a profile of one or more wireless devices in a wireless network using multiuser multiple input multiple output (MU-MIMO);
receiving at the profile of the one or more wireless devices an indicator from one or more access nodes identifying MU-MIMO pairing for the one or more wireless devices in the wireless network, wherein the indicator is available to a user of the one or more wireless devices; and
adjusting one or more of beamforming, layer assignment or throughput of the wireless network based on the one or more wireless device paired for MU-MIMO connections.

9. The system of claim 8, wherein the wireless network is a 5G wireless network and the access node is a gNB device.

10. The system of claim 8, wherein the indicator is a downlink control information (DCI) message which includes performing downlink and uplink scheduling.

11. The system of claim 8, further comprising:
accessing one or more locations of the one or more wireless devices paired for MU-MIMO.

12. The system of claim 11, further comprising:
accessing usage information for the one or more wireless devices paired for MU-MIMO.

13. The system of claim 11, wherein adjusting one or more of beamforming, layer assignment or throughput of the wireless network based on the one or more wireless devices paired for MU-MIMO serves to improve the throughput and/or improve spectral efficiency of the one or more access nodes.

14. A non-transitory computer-readable medium storing instructions, when executed by at least one processor, configuring the at least one processor to:
maintain a profile of one or more wireless devices in a wireless network using multiuser multiple input multiple output (MU-MIMO);
determine that the one or more wireless devices is paired with an access node for MU-MIMO based on satisfying a threshold; and
store an indicator at a profile of the one or more wireless devices that indicates the one or more wireless devices are paired for MU-MIMO, wherein the indicator is available to a user of the one or more wireless devices;
adjust one or more of beamforming, layer assignment or throughput of the wireless network based on the one or more wireless devices using MU-MIMO connections.

15. The non-transitory computer-readable medium storing instructions of claim 14, wherein the wireless network is a 5G wireless network and the access node is a gNB device.

16. The non-transitory computer-readable medium storing instructions of claim 14, wherein the indicator is based on a downlink control information (DCI) message which includes downlink and uplink scheduling.

17. The non-transitory computer-readable medium storing instructions of claim 14, non-transitory computer-readable medium storing instructions:
accessing one or more locations of the one or more wireless devices using MU-MIMO.

18. The non-transitory computer-readable medium storing instructions of claim 17, non-transitory computer-readable medium storing instructions:
access usage information for the one or more wireless devices using MU-MIMO.

19. The non-transitory computer-readable medium storing instructions of claim 14, wherein the at least one processor is further configured to:
adjust one or more of beamforming, layer assignment or throughput of the wireless network based on the one or more wireless devices using MU-MIMO connections.

* * * * *